United States Patent
Ejiri

(10) Patent No.: US 6,244,562 B1
(45) Date of Patent: Jun. 12, 2001

(54) MULTISTAGE SWITCHING VALVE, TWO-STAGE SWITCHING VALVE, AND TOGGLE TYPE TWO-STAGE SWITCHING VALVE

(75) Inventor: Takashi Ejiri, Tokyo (JP)

(73) Assignees: Fujikura Rubber Ltd., Tokyo; Fujikin Incorporated, Osaka, both of (JP)

( * ) Notice: Subject to any disclaimer, the term of this patent is extended or adjusted under 35 U.S.C. 154(b) by 0 days.

(21) Appl. No.: 09/564,520

(22) Filed: May 4, 2000

(30) Foreign Application Priority Data

May 12, 1999 (JP) .................................................. 11-131737
Jan. 14, 2000 (JP) .................................................. 12-005619

(51) Int. Cl.[7] .......................... F16K 31/143; F16K 15/00; F01B 1/02; F01B 7/10
(52) U.S. Cl. ........................... 251/63.6; 251/62; 251/331; 92/62; 92/65
(58) Field of Search .................................. 251/63.2, 63.5, 251/63.6, 62, 61.4, 331, 335.3; 92/62, 65

(56) References Cited

U.S. PATENT DOCUMENTS

| | | | |
|---|---|---|---|
| 4,294,284 | * | 10/1981 | Herd ........................................ 137/613 |
| 4,616,806 | * | 10/1986 | Davis ..................................... 251/63.4 |
| 4,934,652 | * | 6/1990 | Golden ................................. 251/63.621 |
| 5,186,434 | * | 2/1993 | Nishimura et al. ..................... 251/331 |
| 5,762,086 | * | 6/1998 | Ollivier ...................................... 137/1 |
| 5,851,004 | * | 12/1998 | Wu et al. ................................. 251/331 |
| 5,906,353 | * | 5/1999 | Someya et al. ........................... 251/58 |
| 5,924,672 | * | 6/1999 | Crochet et al. ......................... 251/63.6 |

* cited by examiner

Primary Examiner—Joseph A. Kaufman
Assistant Examiner—D A Bonderer
(74) Attorney, Agent, or Firm—McCormick, Paulding & Huber LLP

(57) ABSTRACT

A multistage switching valve includes a valve stem which is adapted to open or close a fluid passage, a biasing biasing means for biasing the valve stem in a direction to close the fluid passage, a plurality of pistons which are relatively slidably fitted onto the valve stem at different axial positions to provide different flow rates, a plurality of stops which are provided on the valve stem to move the valve stem in a valve opening direction opposite to the direction of the movement of the valve stem caused by the biasing biasing means, together with the pistons when the pistons are moved in the valve opening direction, a valve opening means for exerting a pilot pressure in the valve opening direction on each piston, and a flow rate controller for individually restricting the axial displacements of the pistons in the valve opening direction. A two-stage switching valve and a toggle type two-stage switching valve are also disclosed.

12 Claims, 5 Drawing Sheets

MULTISTAGE SWITCHING VALVE, TWO-STAGE SWITCHING VALVE, AND TOGGLE TYPE TWO-STAGE SWITCHING VALVE

BACKGROUND OF THE INVENTION

1. Field of the Invention

The present invention relates to a two-stage switching valve in which a large flow rate and a small flow rate can be obtained using a same passageway, and a multistage switching valve in which more than two different flow rates can be switched.

2. Description of the Related Art

In general, in a conventional fluid system in which a small flow rate (e.g., a few cc/min) and a large flow rate (e.g., a few L/min) is switched, a small flow rate valve and a large flow rate valve are provided in parallel, so that the two valves are selectively opened or closed. However, in the conventional arrangement, since the two valves, i.e., the large flow rate valve and the small flow rate valve, the parallel fluid passageways, and a branch connector (tee) provided at a connection portion to connect the parallel passageways are indispensable, the manufacturing cost of the parts is increased and the pipe laying requires a large space and increases the manufacturing cost. In theory, it is possible to switch the large flow rate and the small flow rate by varying the opening angle of a single valve, but it is next to impossible to precisely and instantaneously switch the flow rate, for example, between a few cc/min and a few L/min.

SUMMARY OF THE INVENTION

It is an object of the present invention to provide a switching valve in which a small flow rate and a large flow rate can be switched by a single valve or more than two different flow rates can be selectively obtained by a single valve.

To achieve the object mentioned above, according to an aspect of the present invention, there is provided a multistage switching valve comprising a valve stem which is adapted to open or close a fluid passage; a biasing means (spring) for biasing the valve stem in a direction to close the fluid passage; a plurality of pistons which are relatively slidably fitted onto the valve stem at different axial positions to provide different flow rates; a plurality of stops which are provided on the valve stem to move the valve stem in a valve opening direction opposite to the direction of the movement of the valve stem caused by the biasing means, together with the pistons when the pistons are moved in the valve opening direction; a valve opening means (pressure actuator) for exerting a pilot pressure in the valve opening direction on each piston; and a flow rate control means (a plurality of stoppers) for individually restricting the axial displacements of the pistons in the valve opening direction.

According to another aspect of the present invention, there is provided a two-stage switching valve comprising a valve stem which is adapted to open or close a fluid passage; a biasing means (spring) for biasing the valve stem in a direction to close the fluid passage; a small flow rate piston and a large flow rate piston, which are relatively slidably fitted onto the valve stem at different axial positions and are arranged in a same cylinder in a predetermined order, to provide different flow rates; a small flow rate stop and a large flow rate stop, which are provided on the valve stem to move the valve stem in a valve opening direction opposite to the direction of the movement of the valve stem caused by the biasing means, together with the small flow rate piston and the large flow rate piston when the small flow rate piston and the large flow rate piston are moved in the valve opening direction; a large flow rate pilot pressure chamber formed in the cylinder to exert a pressure in the valve opening direction on the large flow rate piston; a small flow rate pilot pressure chamber formed in the cylinder to exert a pressure in the valve opening direction on the small flow rate piston; a small flow rate valve opening means (small flow rate pressure actuator) for exerting a small flow rate pilot pressure on the small flow rate pilot pressure chamber; a large flow rate valve opening means (large flow rate pressure actuator) for exerting a large flow rate pilot pressure on the large flow rate pilot pressure chamber; a small flow rate piston restricting means (small flow rate piston stopper) for restricting the axial displacements of the small flow rate piston in the valve opening direction; and a large flow rate piston restricting means (large flow rate piston stopper) for restricting the axial displacements of the large flow rate piston in the valve opening direction.

The present invention also proposes a toggle type two-stage switching valve. In the toggle type, an increased valve opening force can be obtained for the same cylinder diameter, or a smaller diameter cylinder can be used for the same valve opening force.

According to yet another aspect of the present invention, a toggle type two-stage switching valve comprises a valve stem which is adapted to open or close a fluid passage; a biasing means (spring) for biasing the valve stem in a direction to close the fluid passage; a plurality of piston chambers which are defined in a cylinder and are spaced from one another in the axial direction of the valve stem; large flow rate pistons and small flow rate pistons, which are relatively slidably fitted onto the valve stem at different axial positions and are arranged in each piston chamber within the cylinder in the same order; small flow rate stops and large flow rate stops, which are provided on the valve stem, corresponding to the piston chambers within the cylinder, to move the valve stem in a valve opening direction opposite to the direction of the movement of the valve stem caused by the biasing means, together with the small flow rate pistons and the large flow rate pistons when the small flow rate pistons and the large flow rate pistons are moved in the valve opening direction; a small flow rate pilot pressure chamber formed in each piston chamber within the cylinder to exert a pressure in the valve opening direction on the corresponding small flow rate piston; a large flow rate pilot pressure chamber formed in each piston chamber within the cylinder to exert a pressure in the valve opening direction on the corresponding large flow rate piston; a small flow rate valve opening means (small flow rate pressure actuator) for simultaneously exerting a small flow rate pilot pressure on each small flow rate pilot pressure chamber; a large flow rate valve opening means (large flow rate pressure actuator) for simultaneously exerting a large flow rate pilot pressure on each large flow rate pilot pressure chamber; a small flow rate piston restricting means (small flow rate piston stopper) for restricting the axial displacements of at least one small flow rate piston in the valve opening direction; and a large flow rate piston restricting means (large flow rate piston stopper) for restricting the axial displacements of at least one large flow rate piston in the valve opening direction.

The small flow rate piston restricting means can be constituted, for example, by a stroke adjustment cap which is screw-engaged in the cylinder to restrict the axial displacement of the small flow rate piston in the valve opening direction. The large flow rate piston restricting means can be constituted by the large flow rate piston which is closest to the small flow rate piston. If two piston chambers are formed in the cylinder, a tandem type two-stage switching valve is obtained.

The present disclosure relates to subject matter contained in Japanese Patent Applications Nos. 11-131737 (filed on May 12, 1999) and 2000–5619 (filed on Jan. 14, 2000) which are expressly incorporated herein by reference in their entireties.

BRIEF DESCRIPTION OF THE DRAWINGS

The present invention will be discussed below in detail with reference to the accompanying drawings, in which.

DESCRIPTION OF THE PREFERRED EMBODIMENT

Figure 1:
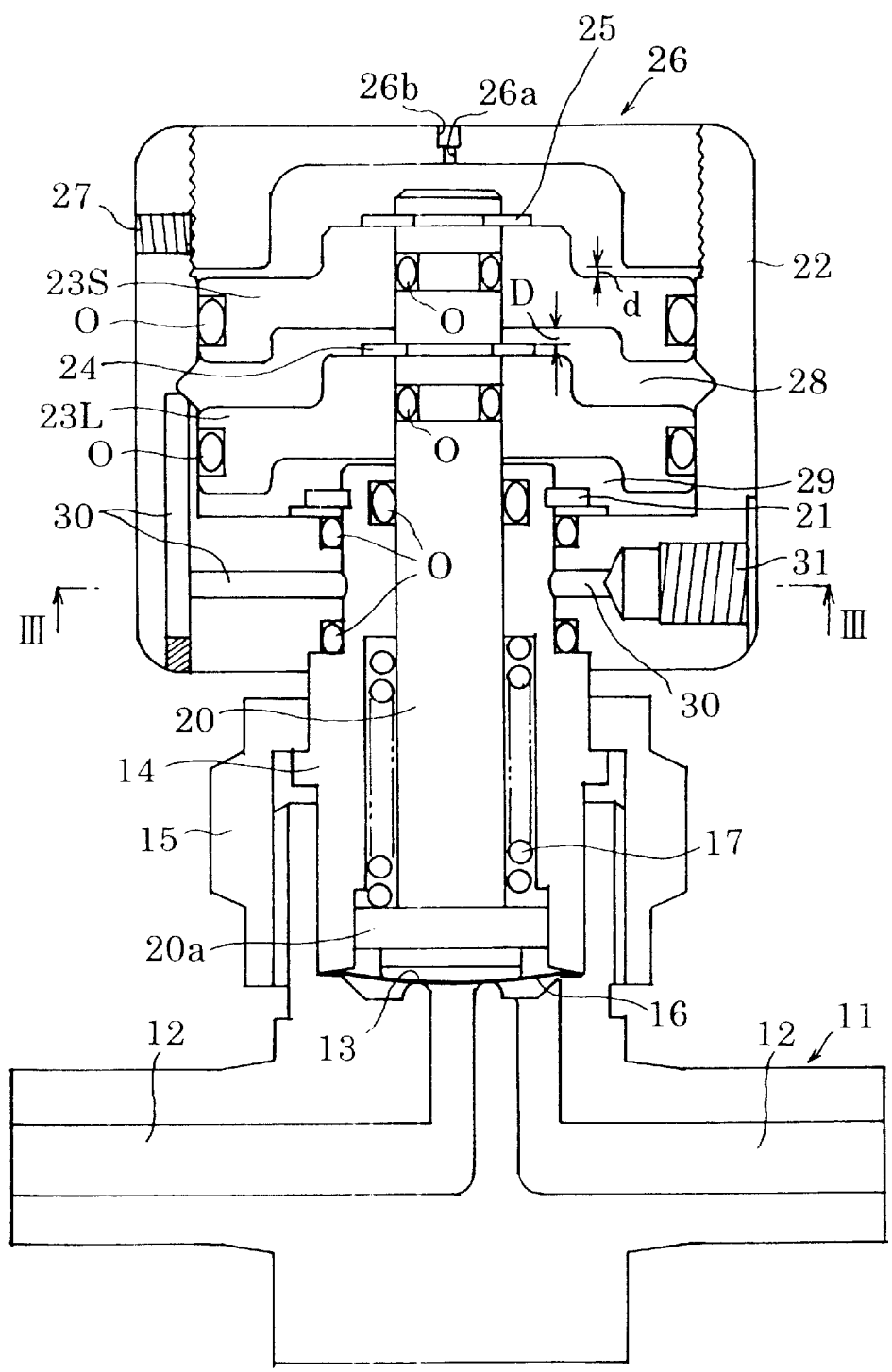
FIG. 1 is a sectional view of a two-stage switching valve taken along the line I—I in FIG. 3, according to an embodiment of the present invention.
Figure 2:
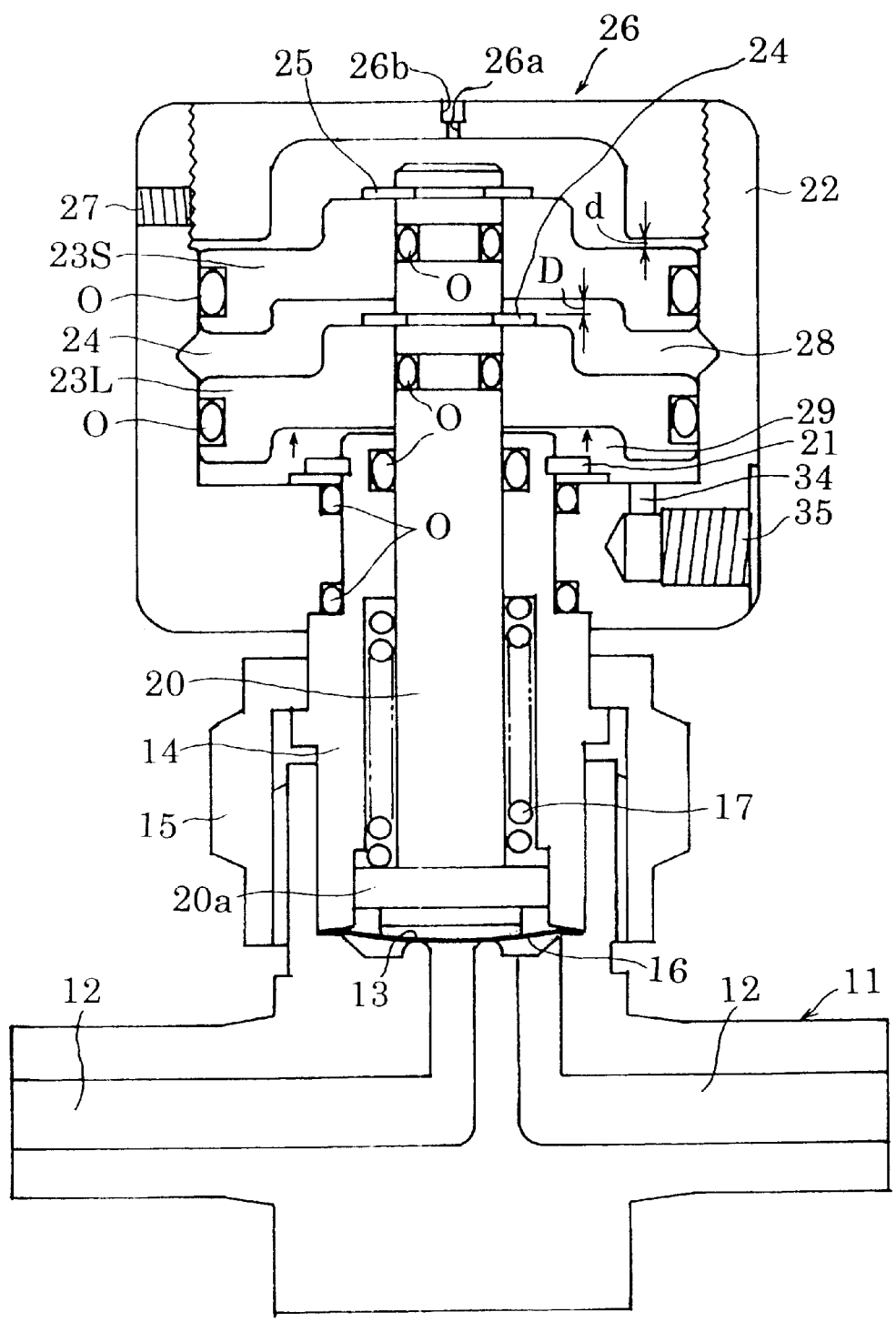
FIG. 2 is a sectional view taken along the line II—II in FIG. 3.
Figure 3:
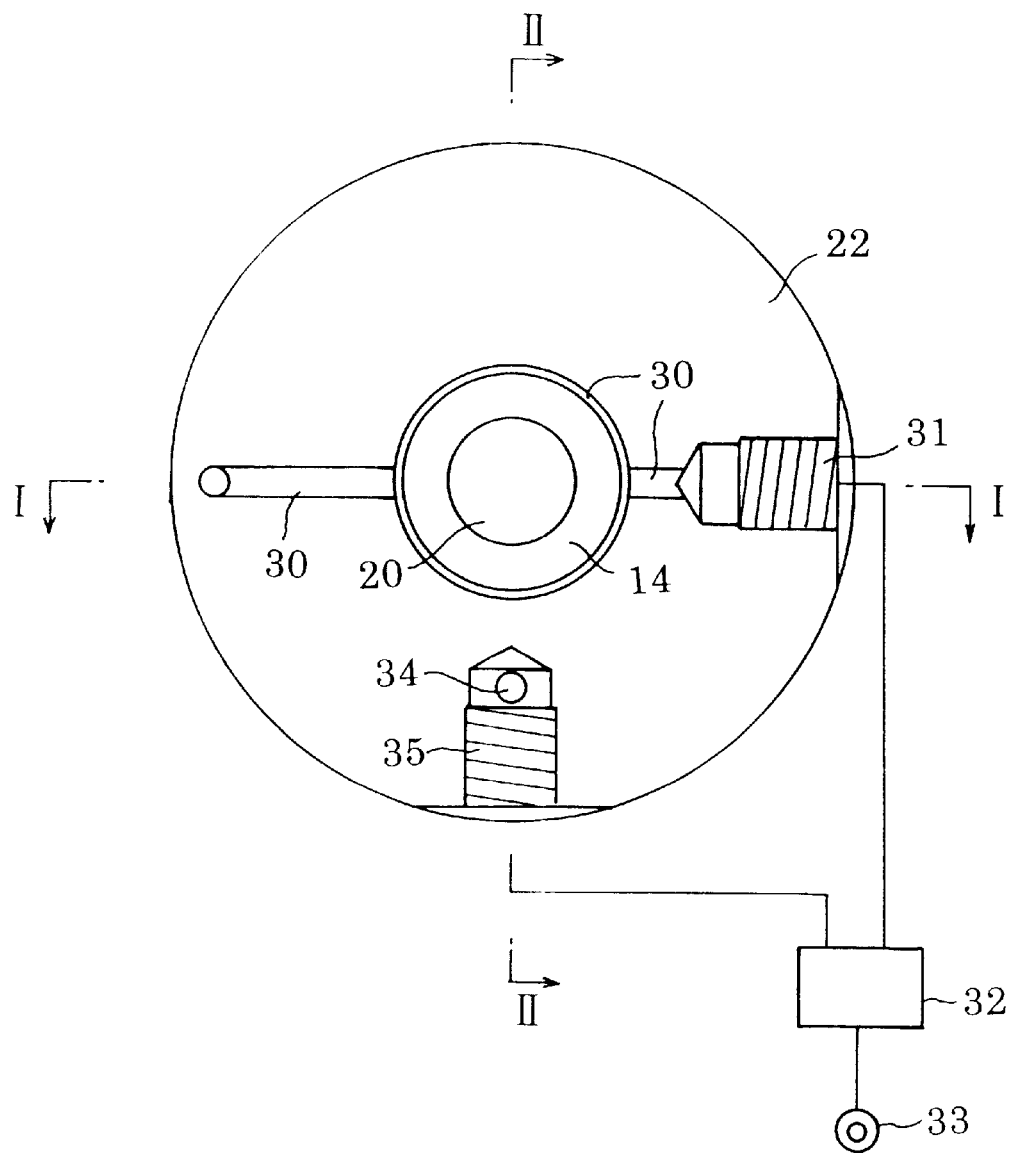
FIG. 3 is a sectional view taken along the line III—III in FIG. 3.

FIGS. 1 through 3 show an embodiment of a multistage switching valve of the present invention, applied to a two-stage switching valve. In FIGS. 1 and 2, a passage block 11 is provided with a passageway 12 which is in turn provided with an annular valve seat 13 having a vertical axis in FIG. 1. The passage block 11 is provided with a rod holder 14 secured thereto by a connector sleeve 15 to slidably guide a valve stem 20 coaxial to the valve seat 13. A circular metal diaphragm 16 is provided between the rod holder 14 and the passage block 11, with the peripheral edge being held between the lower end of the rod holder 14 and the passage block 11, to open or close the annular valve seat 13. A compression spring 17 is provided between the rod holder 14 and a flange 20a of the valve stem 20 to bias the valve stem 20 in the downward direction in FIG. 1 to thereby press the metal diaphragm 16 onto the annular valve seat 13 through the valve stem 20. Consequently, the valve stem 20 is continuously biased in the direction to close the annular valve seat 13 through the metal diaphragm 16 by the spring.

The rod holder 14 is provided on its upper end in FIG. 1 with a cylinder 22 secured thereto through a slip-off prevention ring 21. The cylinder 22 is closed at its lower end by the rod holder 14 and is open at the upper end. The valve stem 20 extends from the rod holder 14 into the cylinder 22.

A large flow rate piston 23L and a small flow rate piston 23S are relatively slidably fitted on the valve stem 20. The valve stem 20 is provided with stop rings 24 and 25 fitted thereon to restrict the upward movement of the large flow rate piston 23L and the small flow rate piston 23S, respectively. The stop rings 24 and 25 are adapted to move the valve stem 20 together with the large flow rate piston 23L and the small flow rate piston 23S in the valve opening direction when the large flow rate piston 23L and the small flow rate piston 23S are moved in the valve opening direction opposite the direction of the movement of the valve stem 20 caused by the spring force of the compression spring 17. The stop rings 24 and 25 cannot restrict the downward movement of the corresponding large and small flow rate pistons 23L and 23S relative to the valve stem 20.

A stroke adjustment cap 26, coaxial to the valve stem 20 is screw-engaged in the open end (upper end) of the cylinder 22 in the drawing. The stroke adjustment cap 26 is adapted to restrict (control) the upward displacement of the small flow rate piston 23S, so that the distance "d" between the small flow rate piston 23S and the stroke adjustment cap 26 can be adjusted or determined in accordance with the screw engagement position of the cap 26 relative to the cylinder 22. The distance "d" is exaggerated in the drawings. A air discharge hole 26a and, on the air discharge hole 26a, a driver groove 26b for a screw driver to rotate the cap 26 are formed in the stroke adjustment cap 26. The stroke adjustment cap 26 and the cylinder 22 are secured by a screw 27 after adjustment.

The upward displacement of the large flow rate piston 23L is restricted by the abutment thereof (i.e., the stop ring 24) with the small flow rate piston 23S. The distance "D" between the large flow rate piston 23L and the small flow rate piston 23S is considerably larger than the distance "d" (D>d).

A small flow rate pilot pressure chamber 28 is defined in and by the cylinder 22, the large flow rate piston 23L the small flow rate piston 23S, and the valve stem 20. A large flow rate pilot pressure chamber 29 is defined between the large flow rate piston 23L and the valve stem 20. The small flow rate pilot pressure chamber 28 is connected to a small flow rate pilot pressure passage 30 and a small flow rate pilot pressure connection port 31, formed in the housing 22. The small flow rate pilot pressure connection port 31 is connected to a pilot pressure source 33 through a control valve 32. Likewise, the large flow rate pilot pressure chamber 29 is connected to a large flow rate pilot pressure passage 34 and a large flow rate pilot pressure connection port 35. The large flow rate pilot pressure connection port 35 is connected to the pilot pressure source 33 through the control valve 32. Note that 0 in FIGS. 1 and 2 show O-rings to seal the valve.

The apparatus constructed as above operates as follows.

When no pilot pressure is introduced in the small flow rate pilot pressure connection port 31 and the large flow rate pilot pressure connection port 35, the valve stem 20 which is biased in the valve closing direction by the compression spring 17 presses the metal diaphragm 16 onto the annular valve seat 13 to close the passageway 12. To establish the small flow rate, the pilot pressure is introduced in the small flow rate pilot pressure connection port 31 through the control valve 32. Consequently, the pilot pressure acts on the small flow rate pilot pressure chamber 28 through the small flow rate pilot pressure passage 30, so that the small flow rate piston 23S and the large flow rate piston 23L receive the upward pressure and the downward pressure, respectively. As a result, the small flow rate piston 23S moves the valve stem 20 in the upward direction through the stop ring 25. The upward movement of the valve stem 20 is restricted when the small flow rate piston 23S abuts against the stroke adjustment cap 26. The distance d between the small flow rate piston 23S and the stroke adjustment cap 26, which is exaggerated in the drawings is (or can be) very small, and hence the gap formed between the metal diaphragm 16 and the annular valve seat 13 is (or can be) small enough to obtain small flow rate of a few cc/min. The large flow rate piston 23L is moved downward relative to the valve stem 20 and abuts against the rod holder 14, but the relative movement has no influence on the establishment of the small flow rate.

To obtain the large flow rate, the pilot pressure is discharged from the small flow rate pilot pressure connection port 31 through the control valve 32, and instead, the pilot pressure is supplied to the large flow rate pilot pressure connection port 35. Consequently, the pilot pressure is introduced in the large flow rate pilot pressure chamber 29 through the large flow rate pilot pressure passage 34, so that the upward pressure acts on the large flow rate piston 23L. As a result, the large flow rate piston 23L moves upward while moving the valve stem 20 together through the stop ring 24. The upward movement of the valve stem 20 is restricted when the large flow rate piston 23L abuts against the small flow rate piston 23S or when the flange 20a of the valve stem 20 abuts against a lower stepped portion (lower shoulder) of the rod holder. Even after the small flow rate piston 23S abuts against the stroke adjustment cap 26, the large flow rate piston 23L and the valve stem 20 can be moved further in the upward direction. Since the distance D between the large flow rate piston 23L and the small flow rate piston 23S is (or can be made) substantially larger than the distance d, the gap formed between the metal diaphragm 16 and the annular valve seat 13 is (or can be) large enough to obtain the large flow rate of a few L/min.

At the large flow rate mode, it is possible, as a matter of course, to introduce the pilot pressure higher than the pilot pressure to be supplied to the small flow rate pilot pressure connection port 31 into the large flow rate pilot pressure connection port 35, in place of stoppage of the pilot pressure supply to the small flow rate pilot pressure connection port 31.

In the illustrated embodiment, the small flow rate pilot pressure chamber 28 is formed between the large flow rate piston 23L and the small flow rate piston 23S, so that the small flow rate pilot pressure chamber 28 can be simply formed. Alternatively, it is possible to provide a stationary wall integral with the cylinder 22, which defines the small flow rate pilot pressure chamber 28 between the stationary wall and the small flow rate piston 23S. Also, although the illustrated embodiment is applied to a two-stage switching valve, it is possible to realize a multistage switching valve as recited in claim 1 of the present application.

Figure 4:
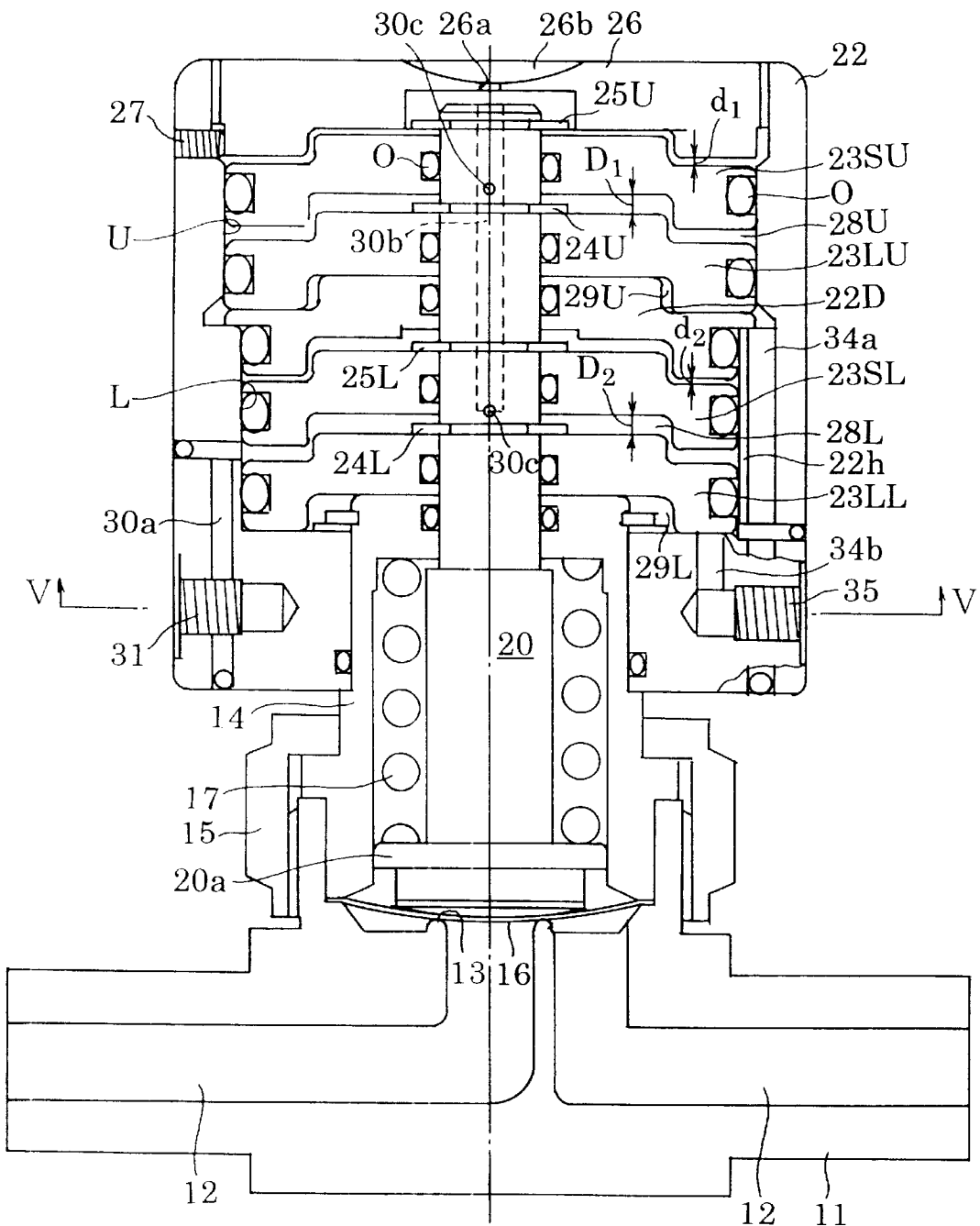
FIG. 4 is a sectional view of a two-stage switching valve in a tandem arrangement, taken along the line IV—IV in FIG. 5, according to an embodiment of the present invention.
Figure 5:
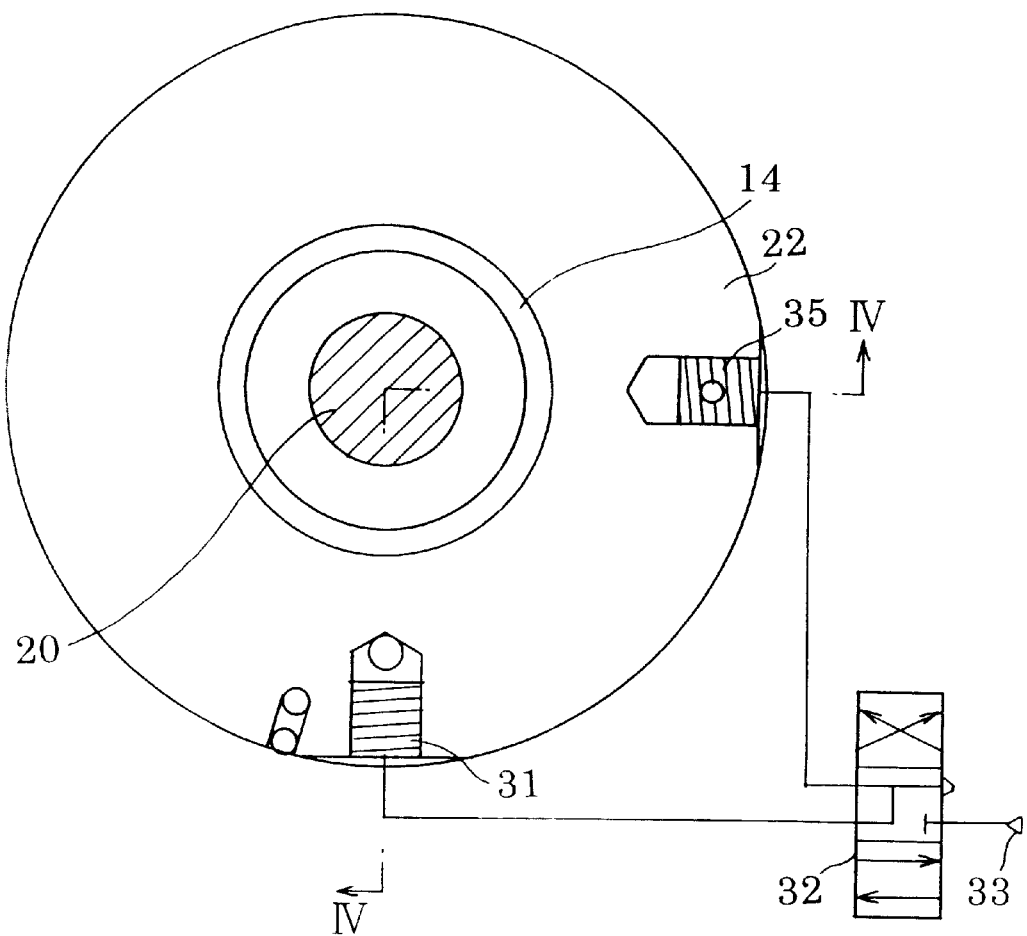
FIG. 5 is a sectional view taken along the line V—V in FIG. 4.

FIGS. 4 and 5 show another embodiment of a toggle type two-stage switching valve in a tandem arrangement. In this embodiment, the cylinder 22 is divided into an upper piston chamber U and a lower piston chamber L by a separation wall 22D. In the piston chambers U and L are relatively slidably arranged the large flow rate piston 23LU, the small flow rate piston 23SU, the large flow rate piston 23LL, and the small flow rate piston 23SL, in this order from the lower portion. The valve stem 20 which extends through the separation wall 22D and the pistons in a fluid-tight fashion is provided with stop rings 24U, 25U, 24L and 25L fitted thereon, corresponding to the pistons 23LU, 23SU, 23LL and 23SL, to restrict the upward movement of the corresponding pistons. The stop rings 24U and 24L move the valve stem 20 together with the large flow rate pistons 23LU and 23LL in the valve opening direction (upward direction) when the large flow rate pistons 23LU and 23LL are moved in the valve opening direction opposite to the direction of the movement of the valve stem 20 caused by the compression spring 17. Likewise, the stop rings 25U and 25L move the valve stem 20 together with the small flow rate pistons 23SU and 23SL in the valve opening direction (upward direction) when the small flow rate pistons 23SU and 23SL are moved in the valve opening direction opposite to the direction of the movement of the valve stem 20 caused by the compression spring 17. The stop rings 24U, 24L and 25U, 25L cannot restrict the downward movement of the large flow rate pistons 23LU and 23LL and the small flow rate pistons 23SU and 23SL, relative to the valve stem 20.

The stroke adjustment cap 26 screwed in the upper open end of the cylinder 22 and the securing screw 27 thereof are same as those shown in FIGS. 1 and 2. The upward movement of the small flow rate pistons 23SU and 23SL is restricted (or determined) by the distance d1 between the stroke adjustment cap 26 and the piston 23SU.

The upward movement of the large flow rate pistons 23LU and 23LL is restricted by the abutment thereof (i.e., the stop rings 24U, 24L thereof) against the small flow rate pistons 23SU and 23SL. The distances D1 and D2 between the large flow rate pistons 23LU, 23LL and the small flow rate pistons 23SU, 23SL are considerably larger than the distances d1 and d2, respectively (D1, D2>d1, d2).

In the piston chamber U, the small flow rate pilot pressure chamber 28U is defined by the large flow rate piston 23LU, the small flow rate piston 23SU and the valve stem 20, and the large flow rate pilot pressure chamber 29U is defined by the large flow rate piston 23LU, the valve stem 20 and the separation wall 22D. Likewise, in the piston chamber L, the small flow rate pilot pressure chamber 28L is defined by the large flow rate piston 23LL, the small flow rate piston 23SL and the valve stem 20, and the large flow rate pilot pressure chamber 29L is defined by the large flow rate piston 23LL and the valve stem 20. The small flow rate pilot pressure chambers 28U and 28L are connected to the connection port 31 through the small flow rate pilot pressure passages 30a, 30b, 30c formed in the housing 22. The small flow rate pilot pressure connection port 31 is connected to the pilot pressure source 33 through the control valve 32. Similarly, the large flow rate pilot pressure chambers 29U and 29L are connected to the connection port 35 through the large flow rate pilot pressure passages 34a, 34b. The large flow rate pilot pressure connection port 35 is connected to the pilot pressure source 33 through the control valve 32.

In this embodiment, to establish the small flow rate mode, the pilot pressure is supplied to the small flow rate pilot pressure connection port 31 through the control valve 23, so that the pilot pressure is introduced simultaneously in the small flow rate pilot pressure chambers 28U and 28L through the small flow rate pilot pressure passages 30a, 30b and 30c. Consequently, the small flow rate pistons 23SU and 23SL receive the upward pressure and the large flow rate pistons 23LU and 23LL receive the downward pressure, respectively. As a result, the small flow rate pistons 23SU and 23SL are moved upward to move the valve stem 20 upward through the stop rings 25U and 25L. Thus, the small flow rate of, for example, a few cc/min, determined depending on the distance d1 between the small flow rate piston 23SL and the stroke adjustment cap 26 can be obtained.

When the pilot pressure is discharged from the small flow rate pilot pressure connection port 31 and instead, the pilot pressure is supplied to the large flow rate pilot pressure connection port 35 through the control valve 32 to establish the large flow rate mode, the pilot pressure is introduced simultaneously in the large flow rate pilot pressure chambers 29U and 29L through the large flow rate pilot pressure passages 34a and 34b, so that the large flow rate pistons 23LU and 23LL receive the upward pressure. As a result, the large flow rate pistons 23LU and 23LL are moved upward to move the valve stem 20 upward through the stop rings 24U and 24L. Thus, the large flow rate of, for example, a few L/min, determined depending on the abutment position of the large flow rate piston 23LU against the small flow rate piston 23SU or the abutment position of the large flow rate piston 23LL against the small flow rate piston 23SL can be obtained.

In this embodiment, since the two pistons receive the pilot pressure either at the small flow rate mode or at the large flow rate mode, a larger opening angle of the valve can be obtained for the same pilot pressure, or a smaller diameter cylinder (piston) can be used for the same valve opening pressure. Consequently, the present invention can be advantageously applied to a normally closed valve in which the compression spring 17 has a strong spring force.

FIGS. 4 and 5 show the tandem arrangement. However, it is theoretically possible to realize a smaller switching valve having a larger output, by increasing the number of the piston chambers formed in the cylinder so that the small and large flow rate pistons are provided in each piston chamber.

Although the valve stem 20 presses the metal diaphragm 16 which opens or closes the annular valve seat 13, in the illustrated embodiments, the present invention can be equally applied to a valve structure in which a metal bellows valve is sued or the valve stem 20 is provided on its lower end with a valve body integral therewith, or a valve structure in which the movement of the valve stem 20 is transmitted to a separate valve body.

Although the pistons 23L, 23LU, 23LL, 23S, 23SU, and 23SL are slidably fitted in the cylinder 22, in the illustrated embodiments, the present invention can be applied to a piston using a rolling diaphragm whose peripheral edge and center portion are secured to the cylinder and the piston body, respectively.

Moreover, the small flow rate piston restricting means for restricting the movement of the small flow rate pistons 23S and 23SU in the valve opening direction can be comprised of a stop other than the stroke adjustment cap 26. Likewise, it is possible to restrict the movement of the large flow rate pistons 23L and 23LL in the valve opening direction, by stops other than those located closest to the small flow rate pistons 23S and 23SU.

As can be seen from the above discussion, according to the present invention, a switching valve in which two flow rates including a small flow rate and a large flow rate or more than two flow rates can be obtained by a single valve is provided. Moreover, according to a two-stage switching valve in a tandem arrangement, a greater output can be obtained for the same cylinder diameter or a smaller diameter cylinder can be used to obtain the same output.

What is claimed is:

1. A multistage switching valve comprising;
   a valve stem which is adapted to open or close a fluid passage,
   a biasing means for biasing the valve stem in a direction to close the fluid passage,
   a plurality of pistons which are relatively slidably fitted onto the valve stem at different axial positions to provide different flow rates,
   a plurality of stops which are provided on the valve stem to move the valve stem in a valve opening direction opposite to the direction of the movement of the valve stem caused by the biasing means, together with the pistons when the pistons are moved in the valve opening direction,
   a valve opening means for selectively exerting a pilot pressure in the valve opening direction on each piston, and
   a flow rate control means for individually restricting the axial displacements of the pistons in the valve opening direction.

2. A two-stage switching valve comprising;
   a valve stem which is adapted to open or close a fluid passage,
   a biasing means for biasing the valve stem in a direction to close the fluid passage,
   a small flow rate piston and a large flow rate piston, which are relatively slidably fitted onto the valve stem at different axial positions and are arranged in a same cylinder in a predetermined order, to provide different flow rates,
   a small flow rate stop and a large flow rate stop, which are provided on the valve stem to move the valve stem in a valve opening direction opposite to the direction of the movement of the valve stem caused by the biasing means, together with the small flow rate piston and the large flow rate piston when the small flow rate piston and the large flow rate piston are moved in the valve opening direction,
   a large flow rate pilot pressure chamber formed in the cylinder to exert a pressure in the valve opening direction on the large flow rate piston,
   a small flow rate pilot pressure chamber formed in the cylinder to exert a pressure in the valve opening direction on the small flow rate piston,
   a small flow rate valve opening means for exerting a small flow rate pilot pressure on the small flow rate pilot pressure chamber,
   a large flow rate valve opening means for exerting a large flow rate pilot pressure on the large flow rate pilot pressure chamber,
   a small flow rate piston restricting means for restricting the axial displacements of the small flow rate piston in the valve opening direction, and
   a large flow rate piston restricting means for restricting the axial displacements of the large flow rate piston in the valve opening direction.

3. A two-stage switching valve according to claim 2, further comprising a stroke adjustment cap which is screw-engaged in the cylinder to restrict the axial displacement of the small flow rate piston in the valve opening direction, so that the small flow rate piston restricting means is constituted by the stroke adjustment cap, said large flow rate piston restricting means being constituted by the large flow rate piston which is closest to the small flow rate piston.

4. A toggle type two-stage switching valve comprising;
   a valve stem which is adapted to open or close a fluid passage,
   a biasing means for biasing the valve stem in a direction to close the fluid passage,
   a plurality of piston chambers which are defined in a cylinder and are spaced from one another in the axial direction of the valve stem,
   large flow rate pistons and small flow rate pistons, which are relatively slidably fitted onto the valve stem at different axial positions and are arranged in each piston chamber within the cylinder in the same order,
   small flow rate stops and large flow rate stops, which are provided on the valve stem, corresponding to the piston chambers within the cylinder, to move the valve stem in a valve opening direction opposite to the direction of the movement of the valve stem caused by the biasing means, together with the small flow rate pistons and the large flow rate pistons when the small flow rate pistons and the large flow rate pistons are moved in the valve opening direction, a small flow rate pilot pressure chamber formed in each piston chamber within the cylinder to exert a pressure in the valve opening direction on the corresponding small flow rate piston, a large flow rate pilot pressure chamber formed in each piston chamber within the cylinder to exert a pressure in the valve opening direction on the corresponding large flow rate piston, a small flow rate valve opening means for simultaneously exerting a small flow rate pilot pressure on each small flow rate pilot pressure chamber, a large flow rate valve opening means for simultaneously exerting a large flow rate pilot pressure on each large flow rate pilot pressure chamber, a small flow rate piston restricting means for restricting the axial displacements of at least one small flow rate piston in the valve opening direction, and a large flow rate piston restricting means for restricting the axial displacements of at least one large flow rate piston in the valve opening direction.

5. A toggle type two-stage switching valve according to claim 4, wherein said small flow rate piston stopper is constituted by a stroke adjustment cap which is screw-engaged in an open end of the cylinder to restrict the axial displacement of the small flow rate pistons in the valve opening direction, and wherein said large flow rate piston restricting means being constituted by the large flow rate pistons which are closest to the small flow rate pistons.

6. A toggle type two-stage switching valve according to claim 4, wherein two said piston chambers are formed in the cylinder.

7. A toggle type two-stage switching valve according to claim 4, wherein two said piston chambers are formed in the cylinder.

8. A multistage switching valve comprising;
a valve stem which is adapted to open or close a fluid passage, a spring for biasing the valve stem in a direction to close the fluid passage, a plurality of pistons which are relatively slidably fitted onto the valve stem at different axial positions to provide different flow rates, a plurality of stops which are provided on the valve stem to move the valve stem in a valve opening direction opposite to the direction of the movement of the valve stem caused by the spring, together with the pistons when the pistons are moved in the valve opening direction, a pressure actuator for exerting a pilot pressure in the valve opening direction on each piston, and a plurality of stoppers for individually restricting the axial displacements of the pistons in the valve opening direction.

9. A two-stage switching valve comprising;
a valve stem which is adapted to open or close a fluid passage, a spring for biasing the valve stem in a direction to close the fluid passage, a small flow rate piston and a large flow rate piston, which are relatively slidably fitted onto the valve stem at different axial positions and are arranged in a same cylinder in a predetermined order, to provide different flow rates, a small flow rate stop and a large flow rate stop, which are provided on the valve stem to move the valve stem in a valve opening direction opposite to the direction of the movement of the valve stem caused by the spring, together with the small flow rate piston and the large flow rate piston when the small flow rate piston and the large flow rate piston are moved in the valve opening direction, a large flow rate pilot pressure chamber formed in the cylinder to exert a pressure in the valve opening direction on the large flow rate piston, a small flow rate pilot pressure chamber formed in the cylinder to exert a pressure in the valve opening direction on the small flow rate piston, a small flow rate pressure actuator for exerting a small flow rate pilot pressure on the small flow rate pilot pressure chamber, a large flow rate pressure actuator for exerting a large flow rate pilot pressure on the large flow rate pilot pressure chamber, a small flow rate piston stopper for restricting the axial displacements of the small flow rate piston in the valve opening direction, and a large flow rate piston stopper for restricting the axial displacements of the large flow rate piston in the valve opening direction.

10. A two-stage switching valve according to claim 9, further comprising a stroke adjustment cap which is screw-engaged in the cylinder to restrict the axial displacement of the small flow rate piston in the valve opening direction, so that the small flow rate piston stopper is constituted by the stroke adjustment cap, said large flow rate piston stopper being constituted by the large flow rate piston which is closest to the small flow rate piston.

11. A toggle type two-stage switching valve comprising;
a valve stem which is adapted to open or close a fluid passage, a spring for biasing the valve stem in a direction to close the fluid passage, a plurality of piston chambers which are defined in a cylinder and are spaced from one another in the axial direction of the valve stem, large flow rate pistons and small flow rate pistons, which are relatively slidably fitted onto the valve stem at different axial positions and are arranged in each piston chamber within the cylinder in the same order, small flow rate stops and large flow rate stops, which are provided on the valve stem, corresponding to the piston chambers within the cylinder, to move the valve stem in a valve opening direction opposite to the direction of the movement of the valve stem caused by the spring, together with the small flow rate pistons and the large flow rate pistons when the small flow rate pistons and the large flow rate pistons are moved in the valve opening direction, a small flow rate pilot pressure chamber formed in each piston chamber within the cylinder to exert a pressure in the valve opening direction on the corresponding small flow rate piston, a large flow rate pilot pressure chamber formed in each piston chamber within the cylinder to exert a pressure in the valve opening direction on the corresponding large flow rate piston, a small flow rate pressure actuator for simultaneously exerting a small flow rate pilot pressure on each small flow rate pilot pressure chamber, a large flow rate pressure actuator for simultaneously exerting a large flow rate pilot pressure on each large flow rate pilot pressure chamber, a small flow rate piston stopper for restricting the axial displacements of at least one small flow rate piston in the valve opening direction, and a large flow rate piston stopper for restricting the axial displacements of at least one large flow rate piston in the valve opening direction.

12. A toggle type two-stage switching valve according to claim 11, wherein said small flow rate piston stopper is constituted by a stroke adjustment cap which is screw-engaged in an open end of the cylinder to restrict the axial displacement of the small flow rate pistons in the valve opening direction, and wherein said large flow rate piston stopper is constituted by the large flow rate pistons which are closest to the small flow rate pistons.

* * * * *